Patented May 5, 1931

1,804,357

UNITED STATES PATENT OFFICE

EMIL LÜSCHER AND HEINRICH STEIGER, OF BASEL, SWITZERLAND, ASSIGNORS TO THE FIRM: ELEKTRIZITATSWERK LONZA, OF GAMPEL AND BASEL, SWITZERLAND

PRODUCTION OF METALDEHYDE

No Drawing. Original application filed June 10, 1925, Serial No. 36,278, and in Germany June 23, 1924. Divided and this application filed July 22, 1926. Serial No. 124,287.

This application is a division of U. S. Patent No. 1,612,032.

The metaldehyde produced according to the U. S. Letters Patent No. 1,555,223 from metal salts and acids and pressed into cakes or press bodies is generally covered some time after lighting by a fine grey to black coating, which hinders the combustion of the block. Research has now shown that the cause of this difficulty is to be found in the residue of the catalyst still remaining in the finished product, although the incombustible residue of the catalyst exists in the metaldehyde only in extremely small quantity, at most a few thousandths per cent, and consequently cannot by itself alone produce so much troublesome ash. It has also been found that several inorganic residues although contained in much larger quantities in the metaldehyde do not affect the combustion to a noticeable degree.

It follows therefore that this catalyst residue produces by-products by contact reaction, which during the combustion, especially with insufficient air supply, causes the formation of carbonaceous slag films on the metaldehye block, which after the combustion have a dry or greasy appearance. These difficulties cannot be removed by a further purification of the metaldehyde, because that would involve almost insuperable difficulties.

We have now discovered that these difficulties do not occur or only occur to a very slight extent if in the production of metaldehyde from acetaldehyde, substances are used as catalysts which during the combustion process evaporate, burn themselves or are separated into their constituent parts, which do not act prejudicially on the unburnt metaldehyde and which at the same time, especially with the use of an excess of acid according to the aforesaid patent, quickly furnish a very good yield of metaldehyde, especially if the catalyst and the acetaldehyde are both used in as waterfree a condition as possible. To this type of catalysts belong oxygen-containing organic compounds which with halogen hydroacids furnish compounds of the oxonium salt type and which have the following general formula

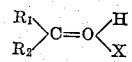

or (and) wherein $R_1$ represents an alkyl radical, $R_2$ a carbonyl radical and X a halogen; for example anisaldehyde-hydrochloride of the formula:

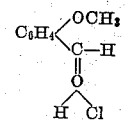

or benzalacetophenonhydrobromide of the formula

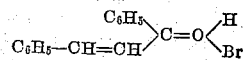

are applicable to the purpose referred to, said compounds being obtained by treatment of the respective parent material with the corresponding halogenhydroacid.

The catalyst can be added in the form of a neutral or acid salt, or can itself be produced in the reacting material, the acetaldehyde being first treated with the base and then with the necessary quantity of acid.

What we claim is:

A process for the production of metaldehyde which burns practically free from soot and ash, consisting in treating acetaldehyde with oxonium halogenates of aldehydes and ketones as catalysts.

In witness whereof we have hereunto signed our names this 7th day of July 1926.

EMIL LÜSCHER.
HEINRICH STEIGER.